(12) United States Patent
Kim

(10) Patent No.: US 6,917,917 B1
(45) Date of Patent: Jul. 12, 2005

(54) APPARATUS AND METHOD FOR VOICE RECOGNITION AND DISPLAYING OF CHARACTERS IN MOBILE TELECOMMUNICATION SYSTEM

(75) Inventor: Yeon-Joo Kim, Songnam-shi (KR)

(73) Assignee: Samsung Electronics Co., LTD (KR)

( * ) Notice: Subject to any disclaimer, the term of this patent is extended or adjusted under 35 U.S.C. 154(b) by 872 days.

(21) Appl. No.: 09/651,648

(22) Filed: Aug. 30, 2000

(30) Foreign Application Priority Data

Aug. 30, 1999 (KR) ........................................ 1999-36377

(51) Int. Cl.[7] ........................... G10L 15/22; G10L 15/26
(52) U.S. Cl. ................ 704/235; 704/270.1; 379/88.01; 455/413; 455/466
(58) Field of Search ........................ 379/88.14, 88.01, 379/88.04, 88.16; 455/413, 466; 704/270, 270.1, 275, 235, 260

(56) References Cited

U.S. PATENT DOCUMENTS

| | | | | |
|---|---|---|---|---|
| 4,525,793 A | * | 6/1985 | Stackhouse | ................. 704/270 |
| 5,371,901 A | * | 12/1994 | Reed et al. | .................... 455/69 |
| 5,956,681 A | * | 9/1999 | Yamakita | .................... 704/260 |
| 5,956,683 A | * | 9/1999 | Jacobs et al. | ............ 704/270.1 |
| 6,067,516 A | * | 5/2000 | Levay et al. | ................. 704/244 |
| 6,094,574 A | * | 7/2000 | Vance et al. | ................. 455/415 |
| 6,148,287 A | * | 11/2000 | Yamakita | ..................... 704/275 |
| 6,198,916 B1 | * | 3/2001 | Martin et al. | ................ 455/413 |
| 6,216,016 B1 | * | 4/2001 | Cronin | ........................ 455/567 |
| 6,260,012 B1 | * | 7/2001 | Park | ............................. 704/236 |
| 6,327,478 B1 | * | 12/2001 | Baker | .......................... 455/466 |
| 6,393,403 B1 | * | 5/2002 | Majaniemi | .................. 704/275 |
| 6,654,448 B1 | * | 11/2003 | Agraharam et al. | ..... 379/88.14 |

* cited by examiner

*Primary Examiner*—Richemond Dorvil
*Assistant Examiner*—Martin Lerner
(74) *Attorney, Agent, or Firm*—Dilworth & Barrese LLP

(57) ABSTRACT

An apparatus and method for speech recognition and character displaying in a mobile telecommunication system. In a speech recognition and character displaying apparatus for a mobile phone, an RF Module processes a signal received from a base station or to be transmitted to the base station by radio, a speech/character conversion table has conversion data for use in converting voice data to character data, a speech recognition and character conversion unit converts the voice signal received, from the base station to voice data using speech recognition and the voice data to character data by referring to the speech/character conversion table, a display displays the converted character data, and a controller provides overall control to the mobile phone, transmits a speech recognition notification request message to the base station in a speech recognition and character display mode, and controls the speech recognition and character display operation.

13 Claims, 4 Drawing Sheets

APPARATUS AND METHOD FOR VOICE RECOGNITION AND DISPLAYING OF CHARACTERS IN MOBILE TELECOMMUNICATION SYSTEM

PRIORITY

This application claims priority to an application entitled "Apparatus and Method for Voice Recognition and Displaying of Characters in Mobile Telecommunication System" filed in the Korean Industrial Property Office on Aug. 30, 1999 and assigned Serial No. 99-36377, the contents of which are hereby incorporated by reference.

BACKGROUND OF THE INVENTION

1. Field of the Invention

The present invention relates generally to a service providing apparatus and method in a mobile telecommunication system, and in particular, to a service providing apparatus and method for receiving a voice signal in a telecommunications system.

2. Description of the Related Art

A mobile telecommunication system includes a base transceiver system (BTS) responsible for radio communication with mobile stations, a base station controller (BSC) for controlling the BTS, a mobile switching center (MSC) for establishing a transmission/reception path for data and control signals between the BSC and the PSTN (Public Switched Telephone Network), and a base station manager for operating and maintaining/repairing the BTS and the BSC. The components above comprise a unit of the system where each unit performs its unique functions and communicates messages over a network connecting the units which together comprise the mobile telecommunication system.

The MSC connects a call from a mobile subscriber to the PSTN so that the mobile subscriber can communicate with subscribers of the PSTN or of other mobile telecommunication networks. The MSC also manages the location information of serviced subscribers and collects billing data. The BSC processes traffic including control information, voice signals, FAX data, and Internet data in relation to a call from the subscriber to provide services to the subscriber terminal. The BTS controls radio resources, receives a radio signal generated from the subscriber, transmits the radio signal via land lines, converts a signal received through the land lines to a radio signal, and transmits the converted radio signal to the subscriber. The mobile station is a subscriber terminal for transmitting/receiving voice signals, FAX data, and Internet data via allocated radio resources.

Operational components within the unit systems include an MMP (MSC main processor) provided to the MSC, an LMU (Location Management Unit) for managing subscriber information, a PIU (PSTN Interface Unit) for interfacing with the PSTN, a BMP (BSC Main Processor) provided to the BSC, an ATU (Air Termination Unit) for interfacing with a mobile station in a radio environment, a TCU (Transcoder Unit) for converting voice information in the radio environment to the form of information eligible for the PSTN, an IAU (Internet Access Unit) for interfacing with the Internet, an IWF (InterWorking Function) for packet data, a BCC (BTS Call Control) provided to the BTS, and a BRC (BTS Resource Control) for allocating radio channel resources.

When a mobile phone rings upon receipt of a call, it is automatically set in a speech state. When it is inconvenient or obtrusive for a user to answer the call, like at a conference or a movie, the user simply hangs up or turns off power to the phone.

However, a caller may continue attempts to complete the call, to converse with the user as soon as possible, without knowing the underlying reasons for the users unavailability. Meanwhile, the user has no way of ascertaining the urgency of the missed call.

Typically in such a case, the caller will record his message or leave his phone number via a voice mail service. A disadvantage of the voice mail service is that the caller must wait for the user to check his voice mail and respond to the recorded message. Both parties are, in many cases, reluctant to use the voice mail service due to the inconvenience of leaving and retrieving messages using a key pad. Callers may repeatedly attempt calls relating to urgent matters, prompting the user to either turn off their mobile phone or obtrusively answer the call in a public place.

As stated above, a short message service (SMS) requires that the user experience the inconvenience of creating a message using keys. Furthermore, when the mobile phone rings upon receipt of a call, it automatically enters a speech state. The user either hangs up or turns off the phone if he is not accepting calls at that particular time.

SUMMARY OF THE INVENTION

It is, therefore, an object of the present invention to provide an apparatus and method for recognizing speech, converting a voice signal to characters, and displaying the characters on a mobile phone in a mobile telecommunication system.

It is another object of the present invention to provide an apparatus and method for allowing a caller to transfer his message to a called user at any time regardless of the situation of the user.

It is still another object of the present invention to provide an apparatus and method for allowing a user to recognize a message from a caller via a display on his mobile phone when he is not available for answering the call in a mobile telecommunication system.

It is a further object of the present invention to provide an apparatus and method for recognizing speech, converting a voice signal to characters, and displaying the characters on a display in a mobile telecommunication system.

It is yet another object of the present invention to provide an apparatus and method for transmitting a paging message to a corresponding mobile phone, transmitting a speech recognition and character display function notifying message to a caller in relation with the paging message upon receipt of a speech recognition and character display request message, applying speech recognition and character data conversion to a voice signal, and character data conversion, and transmitting the converted character data to the corresponding mobile phone in the form of a short message.

The above and other objects of the present invention can be achieved by providing an apparatus and method for speech recognition and character displaying in a mobile telecommunication system. In a speech recognition and character displaying apparatus for a mobile phone, an RF Module processes a signal received from a base station or to be transmitted to the base station by radio, a speech/character conversion table has conversion data for use in converting voice data to character data, a speech recognition and character conversion unit converts the voice signal received from the base station to voice data using speech recognition and the voice data to character data by referring to the speech/character conversion table, a display displays the converted character data, and a controller provides overall control to the mobile phone, transmits a speech recognition notification request message to the base station in a speech recognition and character display mode, and controls the speech recognition and character display operation.

According to another aspect of the present invention, in an apparatus for speech recognition and character displaying for a base station in a mobile telecommunication system, a radio MODEM processes a signal received from a mobile phone or to be transmitted to the mobile phone by radio, a speech/character conversion table has conversion data for use in converting voice data to character data, a speech recognition and character conversion unit converts the voice signal to voice data by speech recognition and the voice data to character data, referring to the speech/character conversion table, and a controller allocates radio resources, performs call processing along with a corresponding unit system like another base station or a mobile switching center, controls the speech recognition and character conversion operation, and transmits converted character data in the form of a short message to a mobile phone.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described hereinbelow with reference to the accompanying drawings. In the following description, well-known functions or constructions are not described in detail to avoid obscuring the invention in unnecessary detail.

Figure 1:
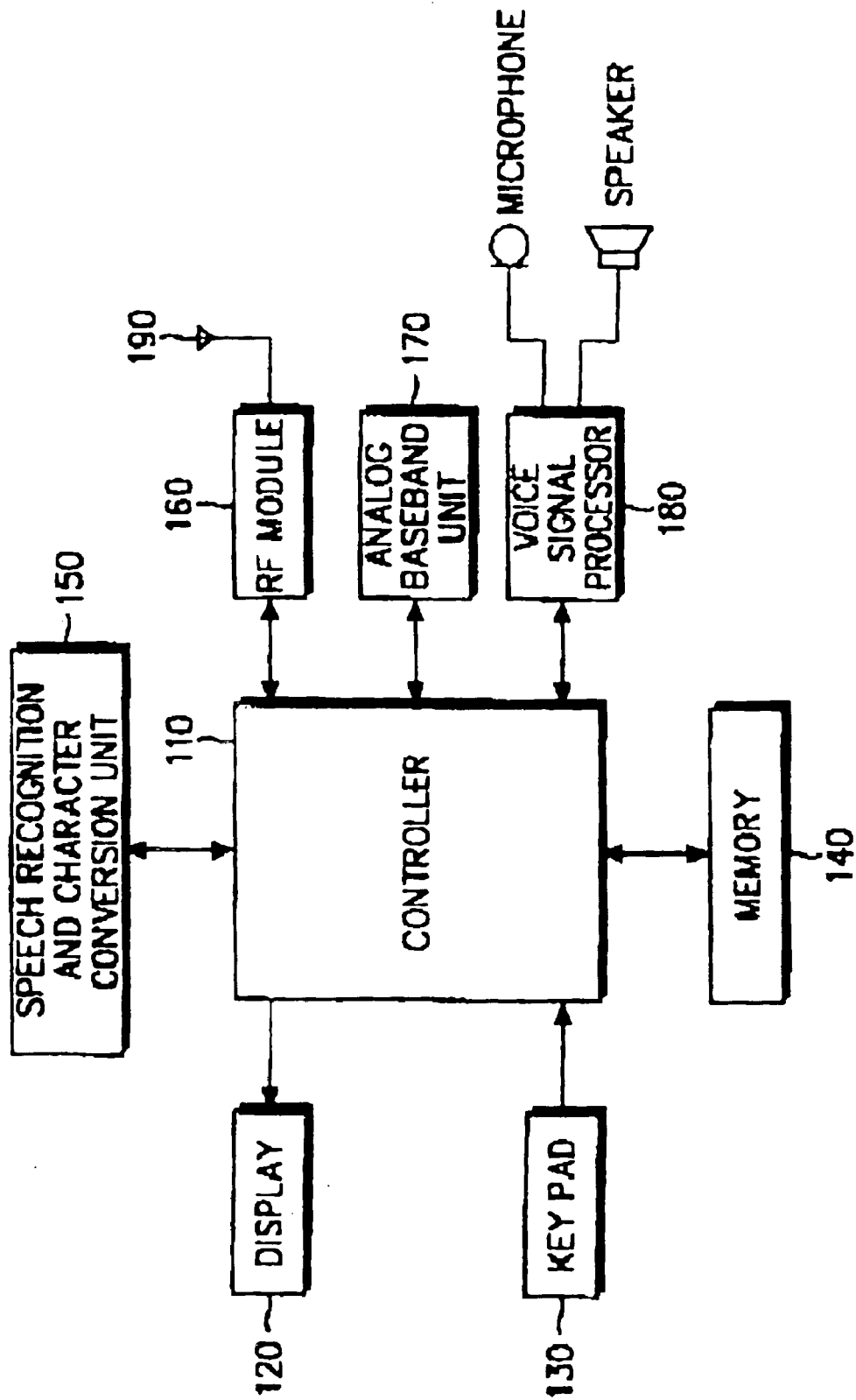
FIG. 1 is a block diagram illustrating a mobile phone in a mobile telecommunication system according to a preferred embodiment of the present invention.

FIG. 1 is a block diagram of a mobile phone in a mobile telecommunication system according to a preferred embodiment of the present invention.

Referring to FIG. 1, a controller 110 provides overall control to the operation of the mobile phone. A memory 140 includes a ROM (Read Only Memory) for storing an operating program, an EEPROM (Electrically Erasable and Programmable ROM), and a RAM (Random Access Memory). The memory 140 stores a program for controlling speech recognition and character data conversion in the mobile phone according to the preferred embodiment of the present invention and has a conversion table referred to for converting voice data to character data.

A display 120 displays the status of the mobile phone or the operation status of a program under the control of the controller 110. The display also displays a message from a caller in the form of character data and a speech recognition and character display menu according to the embodiment of the present invention. The display 120 is preferably an LCD (Liquid Crystal Display).

A key pad 130 has a plurality of digit keys and function keys and outputs key input data to the controller 110 in response to user interaction. The key pad 130 may have a function key with which the speech recognition and character conversion function is implemented.

A speech recognition and character conversion unit 150 converts a voice signal to voice data and the voice data to character data, referring to the conversion table stored in the memory 140 under the control of the controller 110 according to the embodiment of the present invention.

An RF (Radio Frequency) module 160 upconverts the frequency of a signal received from an analog baseband unit 170 and transmits the frequency-upconverted signal to a base station (not shown) via an antenna 190 under the control of the controller 110. The RF module 160 also downconverts the frequency of a signal received via the antenna 190 and outputs the frequency-downconverted signal to the analog baseband unit 170 under the control of the controller 110. The analog baseband unit 170 outputs a signal received from the controller 110 to the RF module 160. The controller 110 subjects a digital signal received from the analog baseband unit 170 to channel demodulation and channel decoding. The controller 110 also outputs corresponding voice data to a voice signal processor 180. The voice signal processor 180 converts the voice data to an audible voice signal via compression/decompression.

The voice signal processor 180 converts a user voice signal received from a microphone to voice data, compresses the voice data, and feeds the compressed voice data to the controller 110. The controller 110 subjects the voice data to channel coding and channel modulation and transmit the modulated signal to the base station via the analog baseband unit 170, the RF module 160, and the antenna 190.

The controller 110 communicates messages with the base station. The controller 110 also controls each component of the mobile phone in relation to a paging message received from the base station and transmits a reverse connect order to the base station upon receipt of some user key data. The controller 110 transmits a speech recognition information request message and a speech recognition request message to the base station according to the embodiment of the present invention.

The controller 110 interfaces with the user via the keypad 130 and display 120. The controller 110 displays menus on the display 120 to allow the user to select a function from a corresponding menu. The controller 110 displays the speech recognition and character display function menu on the display 120 according to the embodiment of the present invention.

According to the first embodiment of the present invention, the mobile phone may add the speech recognition and character display function menu to a main menu, so that the user can quickly and easily select the menu and function when he is not going to be available for answering a calls.

Upon receipt of a paging message, the mobile phone can set a ring type to an alarm mode or a vibration mode as is the case for the conventional technology. Alternatively, the mobile phone may be restricted to lamp blinking and the displaying of character data on the display, to notify a user of an incoming call.

Figure 2:
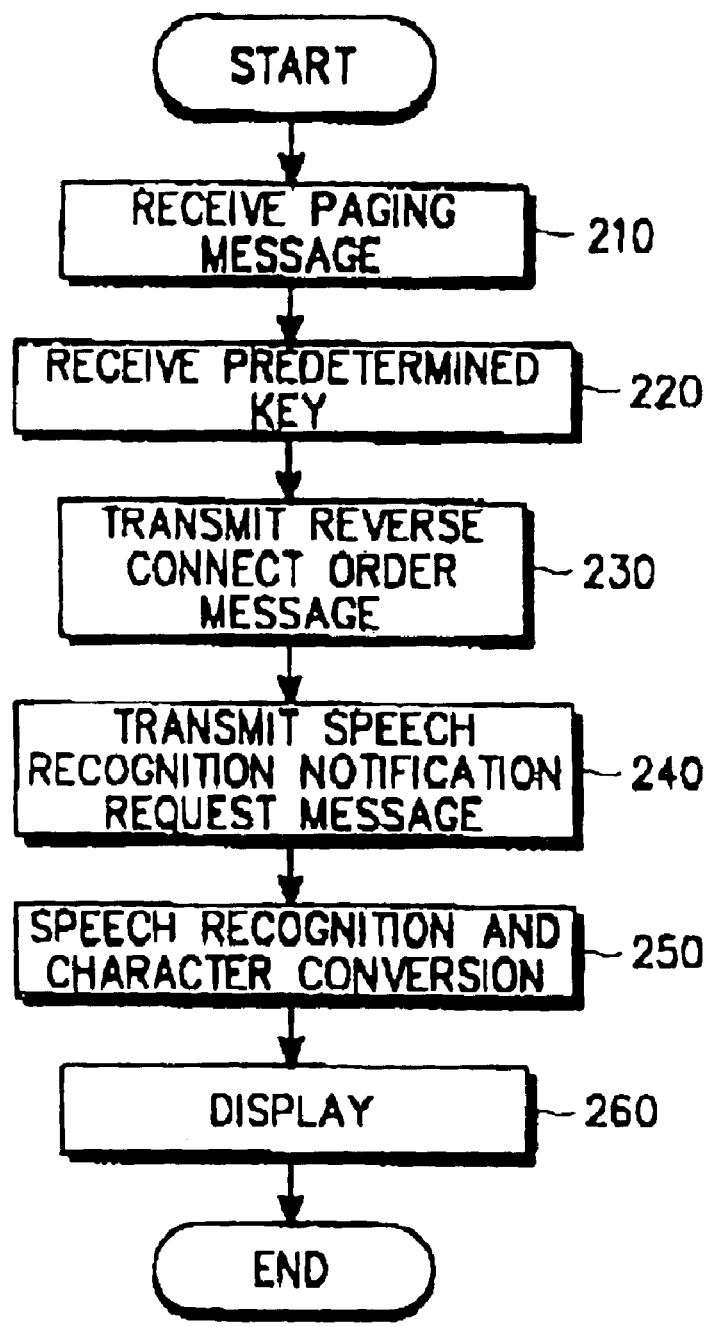
FIG. 2 is a flowchart illustrating a speech recognition and character displaying method in the mobile phone according to the first preferred embodiment of the present invention.

FIG. 2 is a flowchart illustrating a speech recognition and character display method in a mobile communication system according to the first embodiment of the present invention.

Referring to FIG. 2, upon receipt of a paging message in step 210, the controller 110 determines whether predetermined key data has been received from the user in step 220. If the predetermined key has been input, the controller 110 transmits a reverse connect order message to the base station in step 230. In step 240, the controller 110 transmits a speech recognition notification request message requesting that the base station inform a caller of a speech recognition and character display service to allow the caller to record his speech message. Then, the base station recognizes the speech recognition and character display mode of the mobile phone and transmits a pre-recorded corresponding voice information message to the caller. For example, the voice information message can be "The called party is not available. Leave your message and it will be delivered to the called party in a short text message immediately".

In accordance with the first embodiment of the present invention, the controller 110 controls the speech recognition and character conversion unit 150 to recognize speech of the caller and converts the speech to voice data and in turn the voice data to character data in step 250. In step 260, the controller 110 displays the caller's message in the form of the character data on the display 120. The controller 110 may respectively receive the caller's phone number when the caller intends to leave it and display the phone number data additionally on the display 120 in step 260.

Steps 210 to 240 are performed commonly in the first and second embodiments of the present invention. Step 250 of speech recognition and character conversion is implemented in the mobile phone or the base station according to a corresponding embodiment. In the second embodiment, the mobile phone transmits a speech recognition notification request message instead of the information request message to the base station, requesting that the base station implement speech recognition and character conversion. The speech recognition request message will be described again later.

In a CDMA (Code Division Multiple Access) mobile telecommunication system, a short message and a voice signal can be transmitted on the same channel. Therefore, the base station need not open a new channel for receiving the phone number data from the caller.

Alternatively, in the second embodiment of the present invention, the base station performs the speech recognition and character conversion operation. To do so, the base station includes at least a speech and character recognition unit and a speech/character conversion table.

Figure 3:
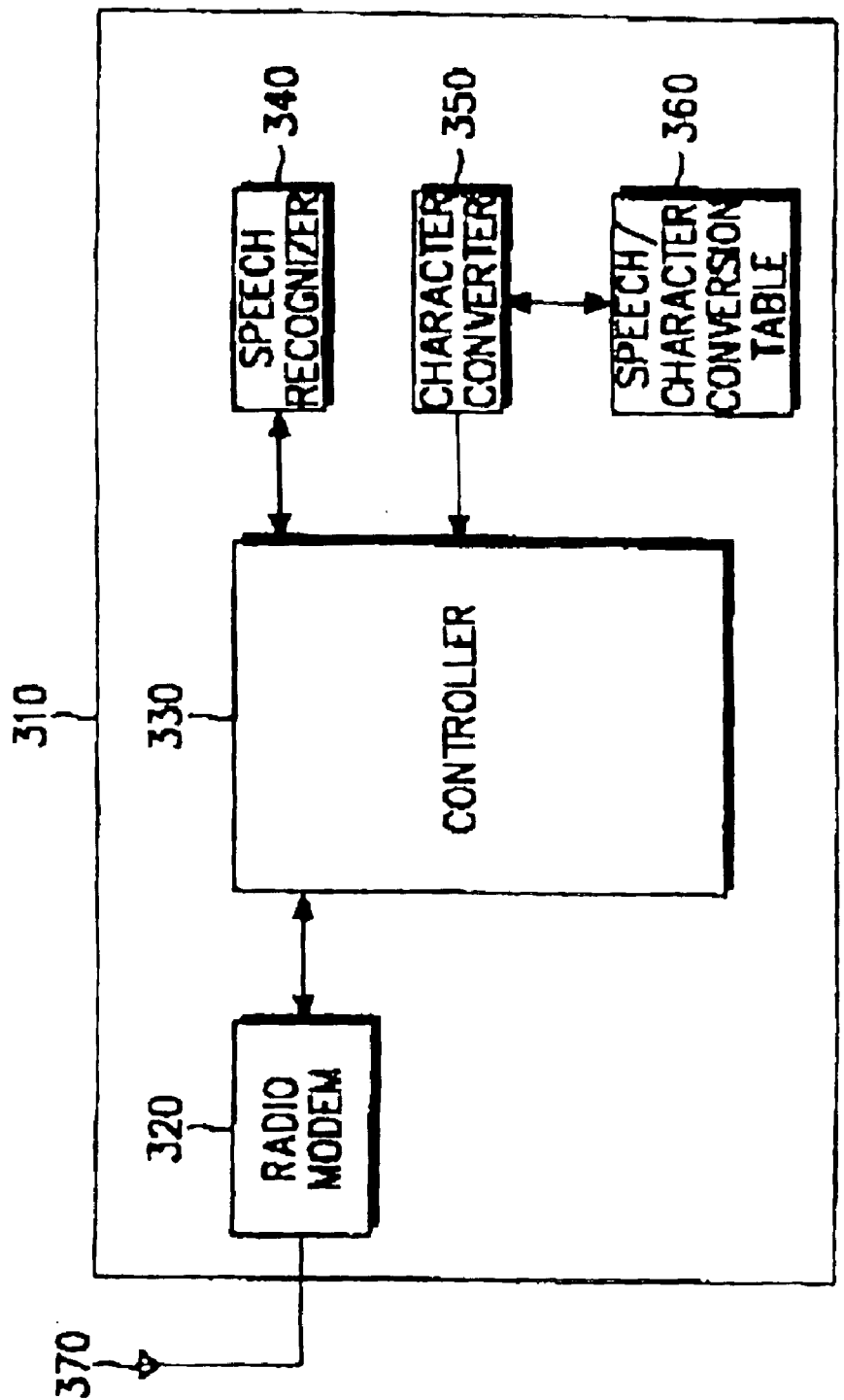
FIG. 3 is a block diagram illustrating a speech recognition and character displaying portion of a base station in the mobile telecommunication system according to another preferred embodiment of the present invention.

FIG. 3 is a block diagram of a speech recognition and character display portion of the base station in the mobile communication system according to the second embodiment of the present invention.

Referring to FIG. 3, a controller 330 provides overall control of the operation of a base station 310. Particularly, the controller 330 allocates radio resources and performs call processing together with a corresponding unit system, such as another base station or an MSC.

Upon receipt of a voice signal through an antenna 370, a radio MODEM 320 processes the voice signal under the control of the controller. A speech recognizer 340 recognizes a voice signal from a caller or his speech and outputs corresponding voice data. A character converter 350 converts the voice data to character data referring to a speech/character conversion table 360 stored in memory. The controller 330 transmits the character data in the form of a short message to the mobile phone of a called party. The called party's mobile phone displays the message from the caller on the display.

While speech recognition and character data conversion of a voice signal received from the radio MODEM 320 has been described in the embodiment of the present invention shown in FIG. 3, the input voice signal may also originate from a corresponding mobile telecommunication unit system.

Figure 4:
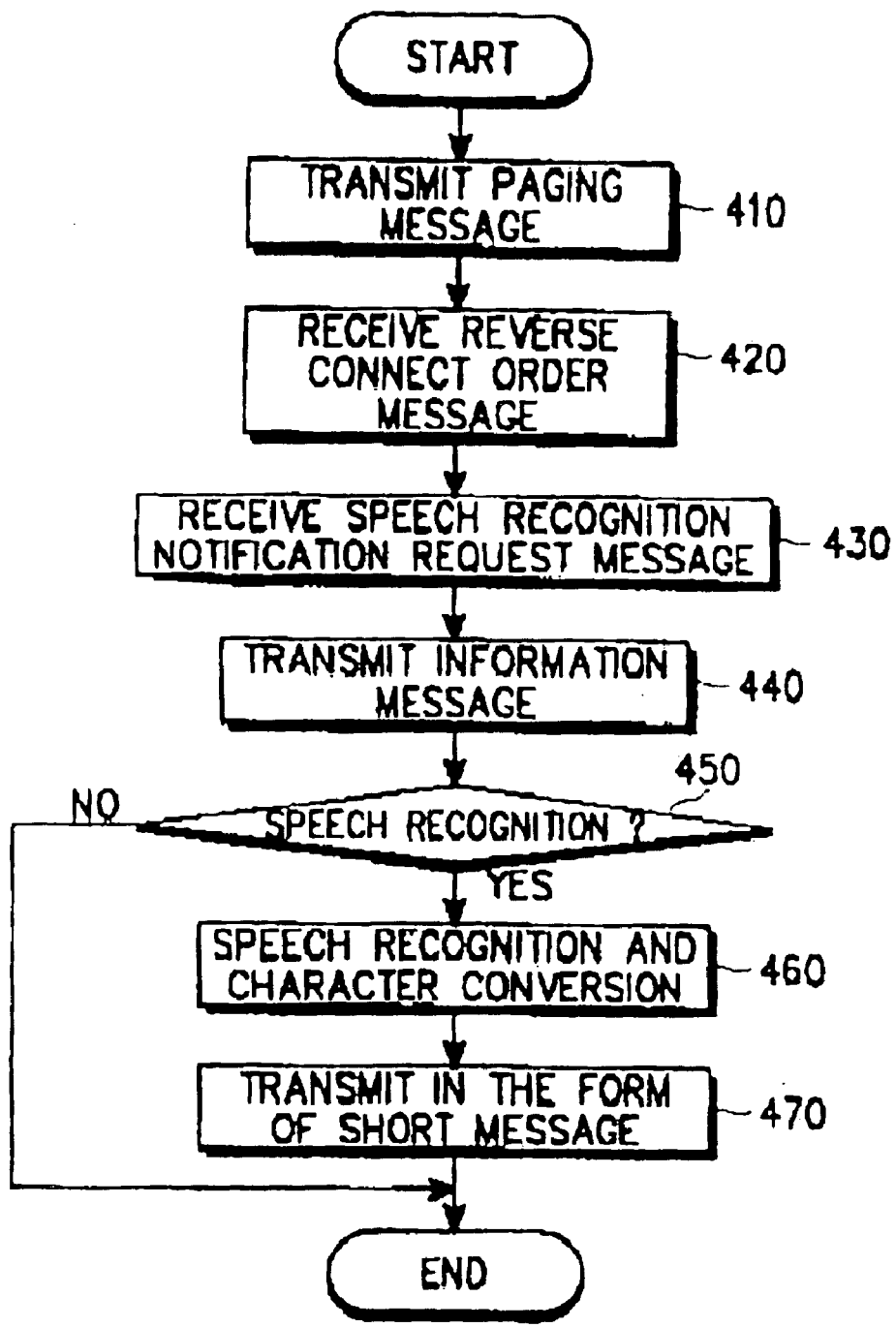
FIG. 4 is a flowchart illustrating a speech recognition and character displaying method in the base station according to the second preferred embodiment of the present invention.

FIG. 4 is a flowchart illustrating a speech recognition and character display method in the base station for the mobile telecommunication system according to the second embodiment of the present invention.

Referring to FIG. 4, the base station transmits a paging message to a corresponding called mobile phone in step 410 and receives a reverse connect order message from the mobile phone in step 420. The mobile phone preferably performs steps 210 to 230 of FIG. 2 here.

In step 430, the base station receives a speech recognition notification request message from the mobile phone according to the embodiment of the present invention. The base station recognizes a speech recognition and character data display mode of the mobile phone and transmits a pre-recorded corresponding voice information message to the caller to allow the caller to record his message by voice in step 440. The voice information message may be "The called party is not available. Leave your message and it will be delivered to the called party immediately", for example.

When the caller selects speech recording, the base station performs the speech recognition function, that is, the base station recognizes the speech of the caller and converts the voice data to character data in step 460 and transmits the character data in the form of a short message to the corresponding receiving mobile phone in step 470. Consequently, the receiving mobile phone displays the message from the caller on its display even during a mode when voice calls are not accepted by the user.

Meanwhile, the base station may optionally receive the phone number of the caller, at the caller's request. The base station transmits the phone number data in addition to the character data to the receiving mobile phone in step 470. Because a short message and a voice signal can be transmitted via the same channel in a CDMA mobile telecommunication system, the base station need not open a new channel for receipt of the phone number data from the caller.

As noted from the above description, a voice signal is subjected to speech recognition and character data conversion and the converted character data is displayed on a mobile phone in the speech recognition and character displaying apparatus and method according to the embodiments of the present invention. The operation of the speech recognition and character data conversion may be implemented by the mobile phone or a base station.

Upon receipt of a paging message, the mobile phone does not enter a voice call mode if it is in a speech recognition and character display mode and transmits a speech recognition notification request message or speech recognition request message to the base station. Then, the base station or the mobile phone implements the speech recognition and character data conversion. The mobile station displays a speech message of a caller in the form of character data on a display.

As described above, the present invention is advantageous in that the inconvenience of writing a message using a key pad, as is the case for the prior art, is eliminated since a voice signal is subjected to speech recognition and character data conversion and converted character data is displayed on a mobile phone. Furthermore, upon receipt of a paging message, the mobile phone does not enter a speech state and the base station or the mobile phone implements the speech recognition and character data conversion. Then, the mobile station displays a speech message of a caller in the form of character data on a display so that the speech message can be delivered to a called at any time regardless the availability of the called party.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for speech recognition and character displaying in a called party mobile phone for receiving an incoming call from a calling party in a mobile telecommunication system, comprising:

an RF Module for processing an RF signal received from a base station;

a memory storing a speech/character conversion table having conversion data for use in converting voice data to character data;

a speech recognition and character conversion unit for converting a voice signal received from the base station to voice data using speech recognition and for converting the voice data to character data by referring to the speech/character conversion table;

a display for displaying the converted character data; and a controller for providing overall control to the mobile phone, transmitting a speech recognition notification request message to the base station if the called party mobile phone is in a speech recognition and character display mode upon receiving a paging message for the incoming call from the calling party, and controlling the speech recognition and character display operation.

2. The apparatus of claim 1, wherein upon receipt of the speech recognition notification request message, the base station recognizes that the called party mobile phone is in the speech recognition and character display mode and transmits a corresponding voice information message to the calling party, wherein the corresponding voice information message indicates a status of the called party mobile phone and directs the calling party to leave a message.

3. The apparatus of claim 1, wherein the controller transmits the speech recognition notification request message to the base station, if predetermined key data has been received by the called party mobile phone, upon receiving the paging message for the incoming call.

4. A method for speech recognition and character displaying in a called party mobile phone for receiving an incoming call from a calling party in a mobile telecommunication system, comprising the steps of:

receiving a paging message for an incoming call from a calling terminal;

determining if the called party mobile terminal is in a speech recognition and character display mode;

transmitting a speech recognition notification request message to a base station, if the called party mobile terminal is in the speech recognition and character display mode;

receiving a voice signal from the calling party through the base station;

converting the received voice signal to voice data using speech recognition;

converting the voice data to character data; and displaying the converted character data on a display of the called party mobile phone.

5. The method of claim 4, wherein upon receipt of the speech recognition notification request message, the base station recognizes that the called party mobile phone is in the speech recognition and character display mode and transmits a corresponding voice information message to a corresponding caller the calling party, wherein the corresponding voice information message indicates a status of the called party mobile phone and directs the calling party to leave a message.

6. The method of claim 4, further comprising the steps of:

determining whether predetermined key data has been received from a keypad of the mobile terminal of the called party;

transmitting the speech recognition notification request message to the base station;

receiving the voice signal from the calling party through the base station;

converting the received voice signal to voice data using speech recognition;

converting the voice data to character data; and displaying the converted character data on the display of the mobile phone.

7. A notification system for notifying a called party of an incoming call from a calling party through voice recognition in a mobile telecommunication system, comprising:

a memory for storing a speech/character conversion table for converting voice data to character data;

a speech recognition and character conversion unit for converting a voice signal received from the calling party through a base station into character data based on the conversion table;

a controller for determining whether a voice recognition mode has been chosen by the called party and informing the base station if the called party has chosen the voice recognition mode, wherein the controller displays the converted character data as a text message on a display of a mobile terminal of the called party.

8. The notification system of claim 7, further comprising:

an RF module for processing an RF signal received from the base station or to be transmitted to the base station by radio.

9. The notification system of claim 7, wherein the controller allows the called party to choose the voice recognition mode by displaying the voice recognition mode in a menu on the display.

10. The notification system of claim 7, wherein the base station transmits a voice information message about the voice recognition mode to the calling party if the called party has chosen the voice recognition mode.

11. The notification system of claim 10, wherein the speech recognition and character conversion unit is located within the mobile terminal of the called party.

12. The notification system of claim 11, wherein the base station accepts a voice message from the calling party and transmits the voice message as the voice signal to the mobile terminal of the called party.

13. The notification system of claim 7, wherein the speech recognition and character conversion unit is located within the base station.

* * * * *